United States Patent Office 2,832,756
Patented Apr. 29, 1958

2,832,756

MONOMERIC POLYMERIZABLE UREIDO AND THIOUREIDO COMPOUNDS, METHODS FOR PRODUCING THEM AND POLYMERS THEREOF

Sidney Melamed, Philadelphia, Pa., assignor to Rohm & Haas Company, Philadelphia, Pa., a corporation of Delaware No Drawing. Original application April 15, 1955, Serial No. 501,708. Divided and this application May 20, 1957, Serial No. 660,425

22 Claims. (Cl. 260—77.5)

The present invention relates to new ureido and thioureido vinyl sulfides which contain a position of monoethylenic unsaturation adapting them to be polymerized by addition polymerization procedures and which also contain alkylated methylol groups adapting them and their polymers to be converted into insoluble, infusible materials, such as by the application of heat, preferably in the presence of an acid catalyst. The present invention also relates to a distinctive method for producing the new monomeric compounds. It also concerns the new polymers including homopolymers and copolymers that may be obtained by the addition polymerization of the new monomers. This application is a division of my copending application Serial No. 501,708, filed April 15, 1955.

It is a primary object of the present invention to provide a novel and improved group of vinyl sulfides of monomeric character which include within their structure monoethylenic unsaturation adapting them to be polymerized by simple addition polymerization to fusible or soluble types of linear polymers, and which also include within their structure alkylated methylol groups adapting the monomers as well as the addition polymers obtained therefrom to be rendered insoluble and/or infusible by simple condensation reactions on heating, preferably in the presence of an acid catalyst. Another object of the invention is to provide a novel method for producing the polymerizable vinyl sulfides of the type described. The advantages of the monomeric and polymeric products as well as of the new method will appear in the following description thereof.

The new compounds of monomeric character provided by the present invention are those having the structure of Formula I following:

(I) 

in which A is phenylene or alkylene having 2 to 4 carbon atoms of which a chain of at least two extend between the adjoined atoms of S and N, R' is H or an alkyl group having 1 to 12 carbon atoms, X is O or S, and R is a lower alkyl group having 1 to 4 carbon atoms.

It is to be noted that these compounds contain a point of unsaturation and are vinyl sulfides joined through an alkylene or phenylene group to a ureido or thioureido group which also contains an alkylated methylol group designated —CH₂OR. All of the compounds within the scope of Formula I, therefore, include the monoethylenic unsaturation and the alkylated methylol group rendering the compounds capable of addition polymerization through the former group and/or condensation polymerization through the latter group.

In accordance with the present invention, the compounds of Formula I are produced by the reaction of a compound of Formula II following with a compound of Formula III following:

(II) H₂C=CHSANHR'
(III) ROCH₂NCX in which the symbols have the same definition as above. The latter compound is an alkoxymethyl isocyanate or an alkoxymethyl isothiocyante. The reaction between Compounds II and III may be effected in bulk or in solution in an inert organic solvent, such as ether, benzene, acetonitrile, dioxane, or t-butanol. The temperature reaction may be from about 0° and 50° C. and is preferably effected with cooling at temperatures between 0° and 20° C. Because of the exothermic nature of the reaction, it is generally desirable to gradually add one of the reactants to the other to facilitate control of the temperature. For example, the unsaturated amine of Formula II may be added to the compound of Formula III.

All of the sulfides of Formula II can be produced by the reaction of acetylene with aminoalkyl mercaptans in the same manner as the corresponding vinyl ethers are produced by reacting acetylene with aminoalkyl alcohols. Thus, they may be produced by reacting the mercaptans and the acetylene at temperatures of 125° C. to 150° C. at pressures on the order of 200 pounds per square inch in the presence of an alkaline catalyst, such as an alkali metal hydroxide, for example KOH and NaOH.

The isocyanates and thioisocyanate of Formula III may be produced directly from aliphatic compounds containing a chloromethoxy group (—OCH₂Cl), such as chloromethoxy methane, chloromethoxy ethane, chloromethoxy propane, chloromethoxy butane, and so on by reacting such chloromethoxy compounds with silver cyanates or alkali metal thiocyanates, such as ammonium, potassium or sodium thiocyanate, at low temperatures of about room temperature up to about 60° C. Reaction may be performed in an anhydrous medium for a period of several hours, such as from 3 to 48 hours. At the conclusion, the solvent contains the isocyanate or isothiocyanate in solution. The salt may simply be filtered off and the solvent stripped off by distillation to leave the desired product of Formula III.

The new compounds of Formula I cannot be made practically by producing monomers of Formula IV:

(IV) 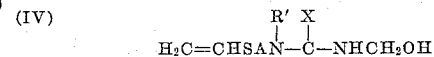

and then reacting them with acid and an alcohol, such as methanol. The introduction of the radical R of the alcohol ROH requires reaction on the acid side and the methylolated vinyl sulfides of Formula IV hydrolyze under acid conditions at a rate which is practically as fast or faster than the reaction with the alcohol. In addition, a sulfur atom of the thioureido group is subject to alkylation at approximtely the same or faster rate than the nitrogen atoms.

The thioureas and ureas of Formula I include many which are liquids and some which are of solid character at normal room temperatures. The ureas are generally somewhat more stable than the thioureas under normal temperatures and humidities of storage but the thioureas are adequately stable for many purposes and uses pointed out hereinbelow. In contrast with vinyl ethers of analogous structure, the vinyl sulfides, while characterized by moderate capacities or rates of polymerization by the addition system, are only slowly hydrolyzed in the presence of dilute acid. Furthermore, the reactive nature toward such compounds as mercaptans and amines is quite different from the reactivity of vinyl ethers. Thus, the vinyl sulfides add mercaptans in the beta position whereas vinyl ethers add alcohols and mercaptans in the alpha position.

Some of the new monomers are effective in controlling fungi, such as *Monolinia fructicola* and *Stemphylium sarcinaeforme*.

The vinyl sulfides of the present invention, while normally sufficiently stable to be stored under normal storage conditions, are readily polymerizable by normal addition polymerization techniques to produce linear types of soluble polymers which can subsequently be insolubilized by heating in the presence of an acidic catalyst.

The present method which involves the introduction of alkoxymethyl groups into the monomeric compounds is distinctly advantageous over procedures of producing polymers of compounds having the structure of Formula V:

(V)

and then attempting to form alkoxymethyl derivatives thereof. While the polymers are less subject to hydrolysis than the monomers on the acid side, it is more difficult to control the extent of entry of the alkoxymethyl groups into the polymer and the distribution of such groups therein. In the case of the thioureas, the sulfur of the urea group is still as readily, or in some cases more readily, attacked than the nitrogen atoms with consequent modification of the polymeric product to form undesired components. In addition, the presence of the alkoxymethyl group in the polymers obtained simply by addition polymerization of the compounds of Formula I of the present invention saves the necessity of subsequently reacting the polymers, such as those obtained by the addition polymerization of the compounds of Formula V with formaldehyde and alcohols, which is extremely undesirable in the case of polymers which are in shaped form such as in the form of coatings, casting, moldings or extruded products.

The monomeric compounds of the present invention are useful as bactericides and fungicides. They may also be used to form linear polymers including homopolymers and copolymers by simple addition polymerization.

The polymerization of the monomeric vinyl sulfides of the present invention is effected in the presence of an acyclic azo compound. In such compound the —N=N— group is attached to aliphatic carbon atoms, at least one of which is tertiary. Typical azo catalysts are azodiisobutyronitrile, azodiisobutyramide, dimethyl (or diethyl or dibutyl) azodiisobutyrate, azobis(α,γ-dimethylvaleronitrile), azobis(α-methylbutyronitrile), azobis(α-methylvaleronitrile), dimethyl azobismethylvalerate, and the like. In these catalysts one of the carbons bonded to the tertiary carbon atom has its remaining valences satisfied by at least one element from the class consisting of oxygen and nitrogen.

To effect polymerization the vinyl sulfides and the acyclic azo catalyst are mixed directly or in the presence of an inert solvent and the mixture is maintained between 60° and 100° C. until the desired extent of polymerization is attained. For water-soluble monomers water may serve as solvent, if desired. Other solvents include methanol, ethanol, isopropanol, butanol, dimethylformamide, benzene, toluene, ethyl acetate, etc. The amount of catalyst may be varied from about 0.1% to about 5% of the weight of the monomer or monomers. The polymerization is best carried out in an inert atmosphere such as nitrogen gas.

For polymerization in solution concentrations of monomer from about 10% to about 60% are generally desirable. The course of polymerization may be readily followed from the increase in viscosity of the solution. The catalyst or initiator may be added in increments, if desired, with or without additional solvent.

For bulk polymerization the preferred temperatures are from about 70° to about 80° C. and the optimum proportion of catalyst is from 0.3% to 1% of the weight of the monomer weight. Under a nitrogen atmosphere a satisfactory degree of polymerization is obtained in 10 to 20 hours.

The polymers which result are soluble substances unless diethylenically unsaturated comonomers are used.

With increase in the size of the groups A, R' and R, the polymers change from water-soluble to solvent-soluble. Thus with increase in size of such groups, the polymer becomes soluble in alcohols or benzene.

The polymers of this invention are classed as high polymers since the polymers are built up of a large number of repeating units. Yet it must be pointed out that the degree of polymerization can readily be controlled by choice of solvent and other conditions of polymerization. Polymers of 10,000 to 200,000 or higher molecular weight may be obtained.

In contrast to alkyl vinyl ethers which copolymerize under the influence of organic peroxides but poorly and in some cases fail to enter into copolymers, the vinyl sulfides of the invention have been found widely useful in copolymerizations. It has been found that these sulfides can be copolymerized with other polymerizable olefinically unsaturated compounds, particularly vinylidene compounds, under the influence of a polymerization catalyst or initiator of the free radical type, such as peroxides or azo catalysts, an acyclic azo compound being particularly useful and advantageous. With an azo catalyst temperatures between 50° and about 100° C. are generally effective for copolymerizing. Somewhat higher temperatures are useful when catalysts of the peroxidic type are used, temperatures between 75° and 150° C. being practical, the above temperatures being those observed for copolymerization in bulk or in solution. Temperatures between 0° and 100° C. or more are useful when copolymerization is carried out in aqueous suspensions or in emulsions.

The same azo catalysts described above for use in forming polymers are used for preparing copolymers, particularly when the major portion of the monomers is a vinyl sulfide of the invention. The amount of catalyst may be varied between 0.1% and 5% of the weight of the monomers to be copolymerized. A range from 0.3% to 1% is preferred, at least at the start. Small amounts of catalyst may be added from time to time as copolymerization proceeds.

When a monomeric sulfide of the invention furnishes the minor portion of an interpolymer, however, other free radical catalysts may prove as desirable as azo catalysts. For example, the above-mentioned organic peroxides, such as butyl perbenzoate, or benzoyl peroxide, are suitable for polymerization in bulk or in solution, while ammonium persulfate and the like are useful in the polymerization of dispersions.

As useful unsaturated compounds for forming the copolymers there may be used esters of acrylic acid or methacrylic acid and monohydric alcohols such as methyl, ethyl, butyl, octyl, dodecyl, cyclohexyl, allyl, methallyl, undecenyl, cyanoethyl, dimethylaminoethyl, and the like; esters of itaconic acid and similar alcohols; esters from maleic, fumaric, or citraconic acids, and likewise similar alcohols; vinyl esters of carboxylic acids such as acetic, propionic, butyric, and the like; vinyloxyalkyl esters such as vinyloxyethyl acetate, etc.; vinyl ethers such as ethyl vinyl ether, butyl vinyl ether, octyl vinyl ether, allyl vinyl ether, hydroxyethyl vinyl ether, aminoethyl vinyl ether, aminopropyl vinyl ether, dimethylaminoethyl vinyl ether, vinyloxyethoxyethanol, vinyloxypropoxyethanol; methacrylonitrile or acrylonitrile; acrylamide, or methacrylamide, and N-substituted amides of these types; vinyl chloride, vinyl bromide, vinylidene chloride, 1-chloro-1-fluoroethylene, or ethylene; 1-acetoxy-1,3-butadiene; styrene, 2-vinylpyridine, 4-vinylpyridine, N-vinylpyrrolidone, formamidoethyl vinyl ether, or divinylbenzene; ethylene diacrylate or dimethacrylate, bis-(vinoxyethyl)urea, vinoxyethyl acrylate, vinoxypropyl acrylate, etc. Where two polymerizable vinylidene groups occur in the same molecule, as in compounds toward the end of the above list, cross-linking results where more than one to two percent thereof is used in forming the copolymer.

There are several important types of classes of interpolymers which should be particularly mentioned. Where it is desired to obtain new properties or variations in properties over the properties of the homopolymer of a ureido or thioureido compound of the invention, there may be used about 1% to about 60% of one or more other polymerizable monoethylenically unsaturated or vinylidene compounds. Often 1% to 20% of the monomers of the present invention is the most useful range to promote the desired modification of properties of other polymeric types. Some valuable examples of copolymers of this sort are those obtained with 1% to 20% of methoxymethylureidoethyl vinyl sulfide and 99% to 80% of acrylamide or N-methyl acrylamide which have water-solubility and are also soluble in organic solvents, such as methanol, or in aqueous-organic solvent systems, such as aqueous methanol or aqueous acetone. These copolymers have marked affinity for cellulose, such as rayon fabrics on which they may be applied and cured to control shrinkage thereof.

Copolymerization, as has been indicated, may be effected in bulk, in solution, or in dispersion. When the monomers to be copolymerized are water-soluble, they may be copolymerized in aqueous solutions. Solvent-soluble monomers may be handled in inert organic solvents such as benzene, toluene, methanol, ethanol, butanol, acetone, methyl ethyl ketone, dimethylformamide, ethyl acetate, ethylene dichloride, etc. Concentrations from about 10% to 60% are conveniently used. The course of copolymerization may be followed from the changes in viscosity or changes in solubility. Monomers and copolymer may be separated, if desired, by precipitation, extraction, distillation, or other conventional step.

Polymerization may also be carried out by techniques useful for forming copolymers in dispersion in aqueous systems. Here a mixture of a monomer of the invention and another polymerizable monoethylenically unsaturated compound without or with an inorganic solvent is dispersed or suspended in water. An emulsifier and/or dispersing agent may be used. The mixture is usually stirred. A polymerization catalyst is added, or catalyst and activator and, if desired, modifiers, such as buffers, metal ions, mercaptans, and the like. Ordinarily dispersions containing 10% to 60% of polymerizable materials are used. Temperatures from below 0° C. to about 100° C. may be used. The preferred temperature range is 15° to 60° C.

The polymers are adapted to be dissolved in a suitable solvent containing an acidic catalyst and to then be applied for various purposes to paper, leather, textiles, wood, metal, glass, plastics and so on as coatings, adhesives, or impregnants which can then be dried and directly converted to insoluble and infusible condition by simply heating. The catalysts used may be ammonium phosphate, ammonium thiocyanate, hydrochlorid or other acid salts of a hydroxy aliphatic amine including 2-methyl-2-amino-1-propanol, 2-methyl-2-amino-1,3-propandiol, tris-(hydroxymethyl)-aminomethane, 2-phenyl-2-amino-1-propanol, 2-methyl-2-amino-1-pentanol, 2-aminobutanol, triethanolamine, 2-amino-2-ethyl-1-butanol, also ammonium chloride, pyridine hydrochloride, benzyldimethylamine oxalate. The amine salts are water-soluble latent catalysts substantially neutral at ordinary temperature but dissociate into volatile components one of which is acidic at the elevated temperatures used for baking and curing, so that the catalyst after exerting its accelerating effect is automaticalyy discharged during the heating or curing stage.

The heat convertible polymers thus applied and converted to insoluble and infusible condition modify the properties and particularly the surface properties of the coated or impregnated substrate. This modification may simply involve the provision of a protective and/or decorative finish or coating on the treated substrate. In the case of paper, the polymers and copolymers containing from 1 to 20 mole percent of units having the structure of Formula I serve to impart wet strength thereto. The polymers applied for this purpose may simply be incorporated in the pulp, at the beater, or as it proceeds to the wire of the paper-making machine. The polymers may be applied to wool and rayon or cotton fabrics for the purpose of reducing water-sensitivity and stabilizing the fabrics thereof against shrinkage on laundering. They may also be applied to cotton and rayon fabrics for crush-proofing and crease-proofing. Water-repellency may be imparted to leather and textile fabrics, especially cottons and rayons when the polymers contain hydrophobic groups, such as long-chain R' groups having 8 to 12 carbon atoms or hydrophobic groups in comonomers such as copolymers containing comonomers if higher alcohol esters of acrylic or methacrylic acid, such as lauryl methacrylate.

The homopolymers and copolymers of the present invention may be used to form films, sheets, rods, tubes, and other shaped articles by casting, molding, or extrusion of either fused masses of the polymers or of solutions thereof in suitable solvents, especially organic solvents such as dimethylformamide and acetone.

The compositions containing the homopolymers and copolymers of the present invention dissolved or suspended in suitable media, such as water or organic solvents, may be dyed, pigmented, or provided with extenders, fillers, or the like, and may be combined with other film-forming or coating resins, such as aminoplasts, including urea-formaldehyde or melamine-formaldehyde resins, alkyds or vinyl polymers. Such compositions may be applied to all sorts of substrates and subsequently converted by heating to a baked enamel finish, as on porcelain, metals, and so on. Pigments, such as titanium dioxide, lithopone, barium sulfate, ultramarine blue, may be used for this purpose.

In the following examples, the parts are by weight unless otherwise specifically indicated, and generally the abbreviation "m" is used to designate "moles:"

*Example 1*

A solution of 23 grams of 2-(N-methylamino)ethyl vinyl sulfide in 250 ml. of ether is stirred, cooled, and treated slowly with 23 grams of n-propoxymethyl isocyanate. The addition is completed in 30 minutes and stirring is continued for an additional 15 minutes. The product is $CH_2=CHSCH_2CH_2N(CH_3)CONHCH_2OC_3H_7$-n, N-methyl-N-vinylthioethyl N'-n-propoxymethylurea, isolated as a yellow oil. This material is useful as a pesticide, particularly as a contact insecticide for the control of aphids.

*Example 2*

A condensation of 26 grams of methoxymethyl isothiocyanate and 38 grams of 2-aminophenyl vinyl sulfide is effected in 200 ml. of ether at 0° to 15° C. The product, 61 grams, is isolated a white solid, M. P. 88° to 94° C. Recrystallization from anhydrous ethanol gives an 82.5% yield of pure material, M. P. 97° to 98° C. containing 10.5% N and 24.8% S corresponding to N-(2-vinylthiophenyl)-N'-methoxymethylthiourea,

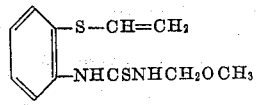

This material is effected as a fungicide for the control of the Monilinia and Stemphylium organisms supra. It may be applied from solutions or as a dust formulated with diluent clays.

*Example 3*

A similar condensation of 51 grams of 2-aminophenyl vinyl sulfide and 48.5 grams of butoxymethyl isothiocyanate in ether gives the product as a pale yellow solid which is recrystallized from ethanol. It corresponds to N-(2-vinylthiophenyl)-N'-butoxymethylthiourea,

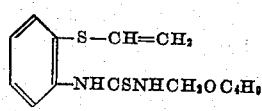

This material is an effective fungicide. The product contains by analysis 9.3% N and 21.7% S. The theoretical values are 9.43% N and 21.6% S.

*Example 4*

A condensation of 14.5 grams of 3-(N-ethylamino)-propyl vinyl sulfide and 11.5 grams of propoxymethyl isothiocyanate is effected in dry acetone to give N-ethyl-N-3(vinylthio)propyl-N'-propoxymethylthiourea

*Example 5*

A mixture of 50 grams of N-methyl-N-vinylthioethyl-N'-n-propoxymethylurea, the product of Example 1, 50 grams of dimethylformamide, and 1.0 gram of dimethyl azoisobutyrate is heated at 75° C. for 8 hours to give a 90% conversion to polymer. Films are prepared on glass and metal by casting 5-mil wet films and baking for 30 minutes at 300° F. The films are tough but are thermoplastic. The process is repeated but the solution is catalyzed before filming with 0.2% of butyl phosphoric acid. The cured films are tough, clear, solvent and print-resistant with good adhesion to glass and metal.

*Example 6*

A solution of 60 grams of butyl methacrylate, 30 grams of methyl methacrylate and 20 grams of the product of Example 1 is prepared in 150 grams of ethoxyethyl acetate, and 0.5 gram of azoisobutyronitrile is added in a 2-hour period with stirring to a vessel maintained at 80° to 85° C. The resultant solution is treated with two 0.25 gram increments of the azonitrile at 2-hour intervals. The resultant resin solution has a light yellow color and a Gardner-Holdt viscosity of X. The product is useful as a coating material for baking enamels. It may be pigmented with an equal weight of titania pigment to resin solids to give after baking glossy, white, hard coatings suitable for appliance finishes.

*Example 7*

(*a*) A mixture of 6 grams of N-2-vinylthiophenyl-N'-methoxymethylthiourea obtained in Example 2, 2 grams of dimethylformamide, and 0.06 gram of dimethyl azoisobutyrate is heated at 75° C. for 16 hours. The resultant polymer is insoluble in water, dimethylformamide, acetone, and xylene.

(*b*) The monomer of part (*a*) may be mixed with dimethyl azoisobutyrate and polymerized in a heated mold to form a casting.

(*c*) Similarly a mixture of 6 grams of the same monomer prepared in Example 2, 0.4 gram of methyl methacrylate, 0.1 gram of dimethyl azoisobutyrate, and 10 grams of toluene gives an insoluble polymer at 75° C. in 16 hours.

It is to be understood that changes and variations may be made without departing from the spirit and scope of the invention as defined in the appended claims.

I claim:

1. As a composition of matter, a compound having the formula

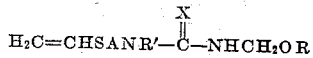

in which A is selected from the group consisting of phenylene and alkylene groups having 2 to 4 carbon atoms of which a chain of at least two extend between the adjoined atoms of S and N, R' is selected from the group consisting of H and alkyl groups having 1 to 12 carbon atoms, X is selected from the group consisting of O and S, and R is a lower alkyl group having 1 to 4 carbon atoms.

2. A polymer of a compound of claim 1.

3. As a composition of matter, a compound having the formula

where A is an alkylene group having 2 to 4 carbon atoms of which a chain of at least two extend between the adjoined atoms of S and N, R' is an alkyl group having 1 to 12 carbon atoms, and R is a lower alkyl group having 1 to 4 carbon atoms.

4. A polymer of a compound of claim 3.

5. A copolymer of a compound of claim 3 and an ester of methacrylic acid with an alcohol having 1 to 4 carbon atoms.

6. As a composition of matter, a compound having the formula

where A is a phenylene group and R is an alkyl group having 1 to 4 carbon atoms.

7. As a composition of matter, a compound having the formula

where A is an alkylene group having 2 to 4 carbon atoms of which a chain of at least two extend between the adjoined atoms of S and N, R' is an alkyl group having 1 to 12 carbon atoms, and R is a lower alkyl group having 1 to 4 carbon atoms.

8. As a composition of matter, N-(2-vinylthiophenyl)-N'-methoxymethylthiourea.

9. As a composition of matter, N-methoxymethyl-N'-vinylthioethylthiourea.

10. As a composition of matter, N-methyl-N-vinylthioethyl-N'-n-propoxymethylurea.

11. A polymer of the compound of claim 10.

12. A copolymer of the compound of claim 10 and an ester of methacrylic acid with an alcohol having 1 to 4 carbon atoms.

13. A copolymer of the compound of claim 10 with methyl methacrylate.

14. A copolymer of the compound of claim 10 with butyl methacrylate.

15. A copolymer of the compound of claim 10 with methyl methacrylate and butyl methacrylate.

16. A method for producing a compound of the formula $H_2C=CHSANR'CXNHCH_2OR$ comprising reacting a compound having the formula:

with a compound having the formula:

where A is selected from the group consisting of phenylene and alkylene groups having 2 to 4 carbon atoms of which a chain of at least two extend between the adjoined atoms of S and N, R' is selected from the group consisting of H and alkyl groups having 1 to 12 carbon atoms, X is selected from the group consisting of O and S, and R is a lower alkyl group having 1 to 4 carbon atoms.

17. A method as defined in claim 16 in which the reaction is effected at a temperature of about 0° to 50° C.

18. A method which comprises the step of polymerizing a compound of claim 1 by means of a free radical catalyst.

19. A method as defined in claim 18 in which the catalyst is an azo catalyst.

20. A method as defined in claim 18 in which polymerization with other comonomers is effected in the presence of a free radical catalyst selected from the group consisting of azo catalysts, organic peroxide catalysts including peroxides and perbenzoates, and inorganic persulfates.

21. A polymer of the compound of claim 8.

22. A copolymer of the compound of claim 8 with methyl methacrylate.

No references cited.